May 30, 1961  V. E. OKERSTROM  2,986,205
TIRE TREAD SKIVING MACHINE
Filed Jan. 12, 1959  5 Sheets-Sheet 1

INVENTOR.
VILMER E. OKERSTROM
BY C. G. Stratton
ATTORNEY

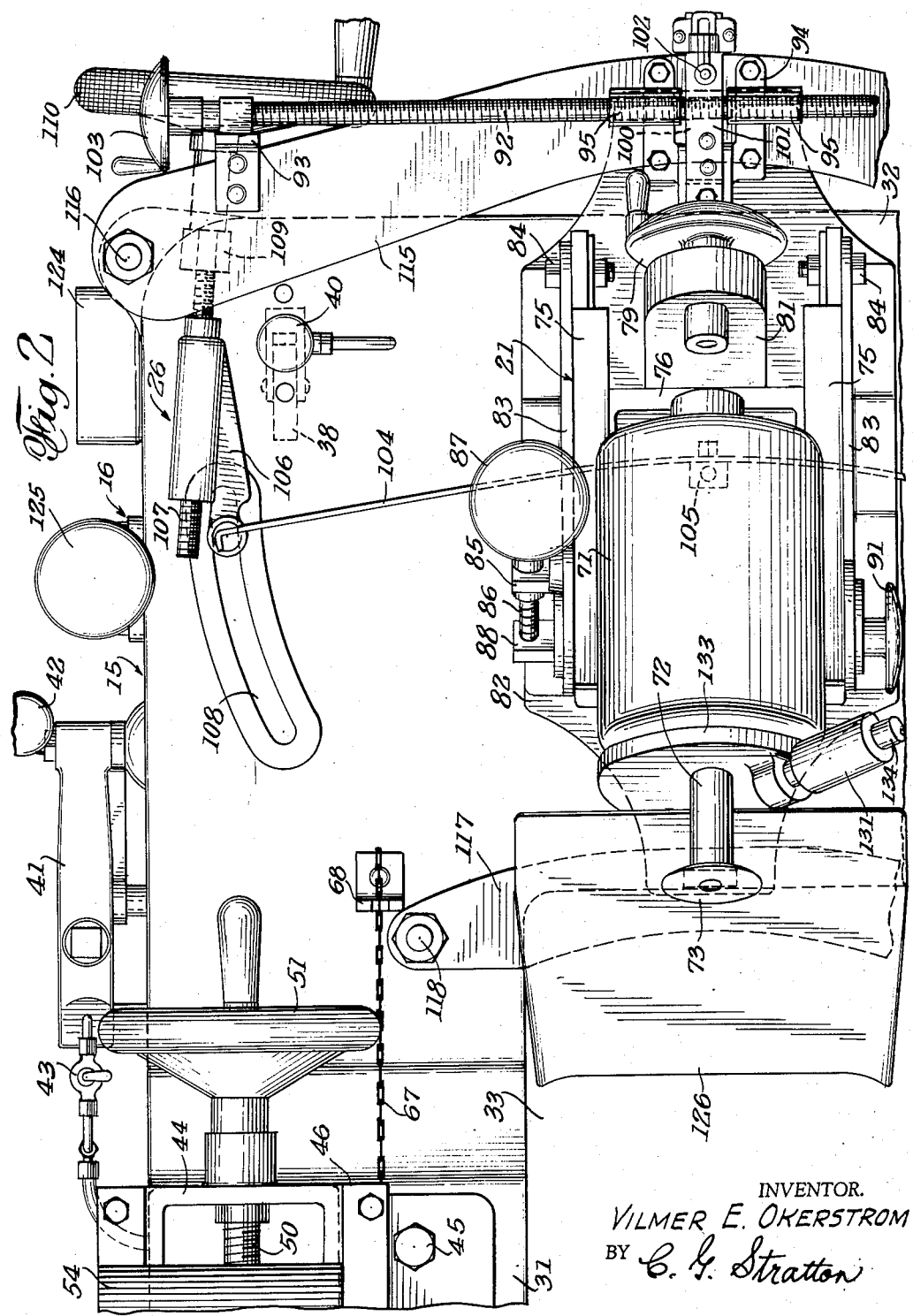

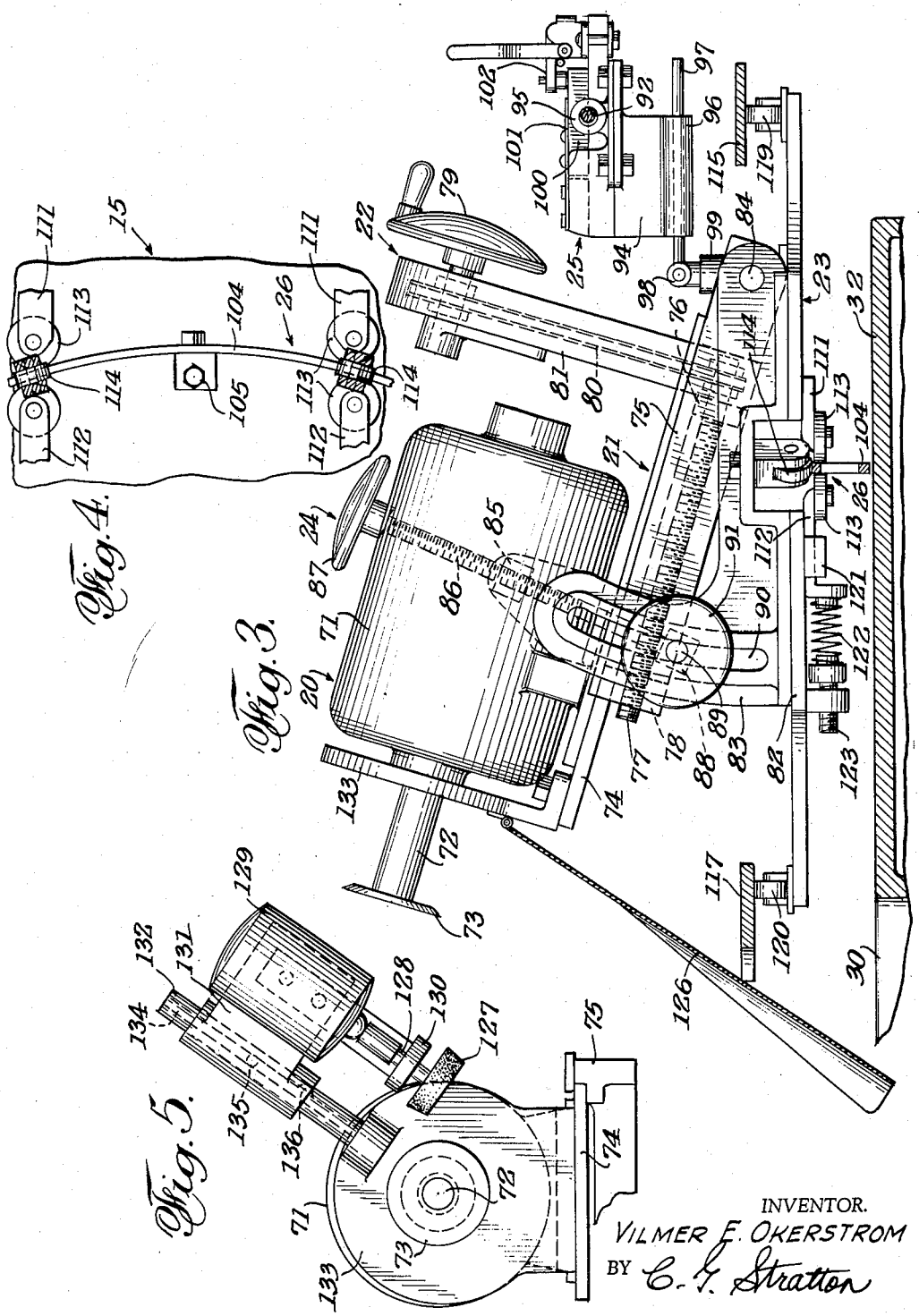

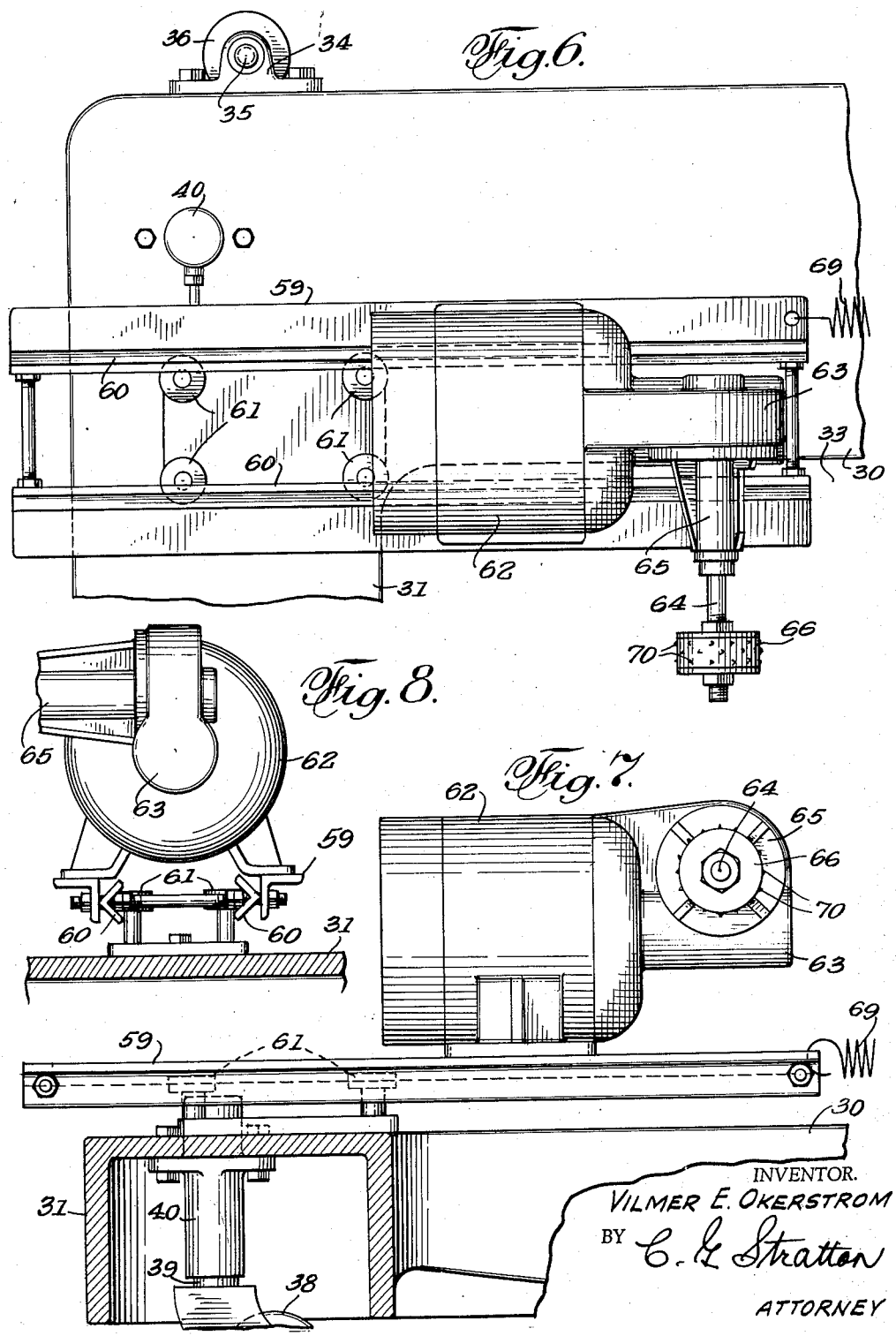

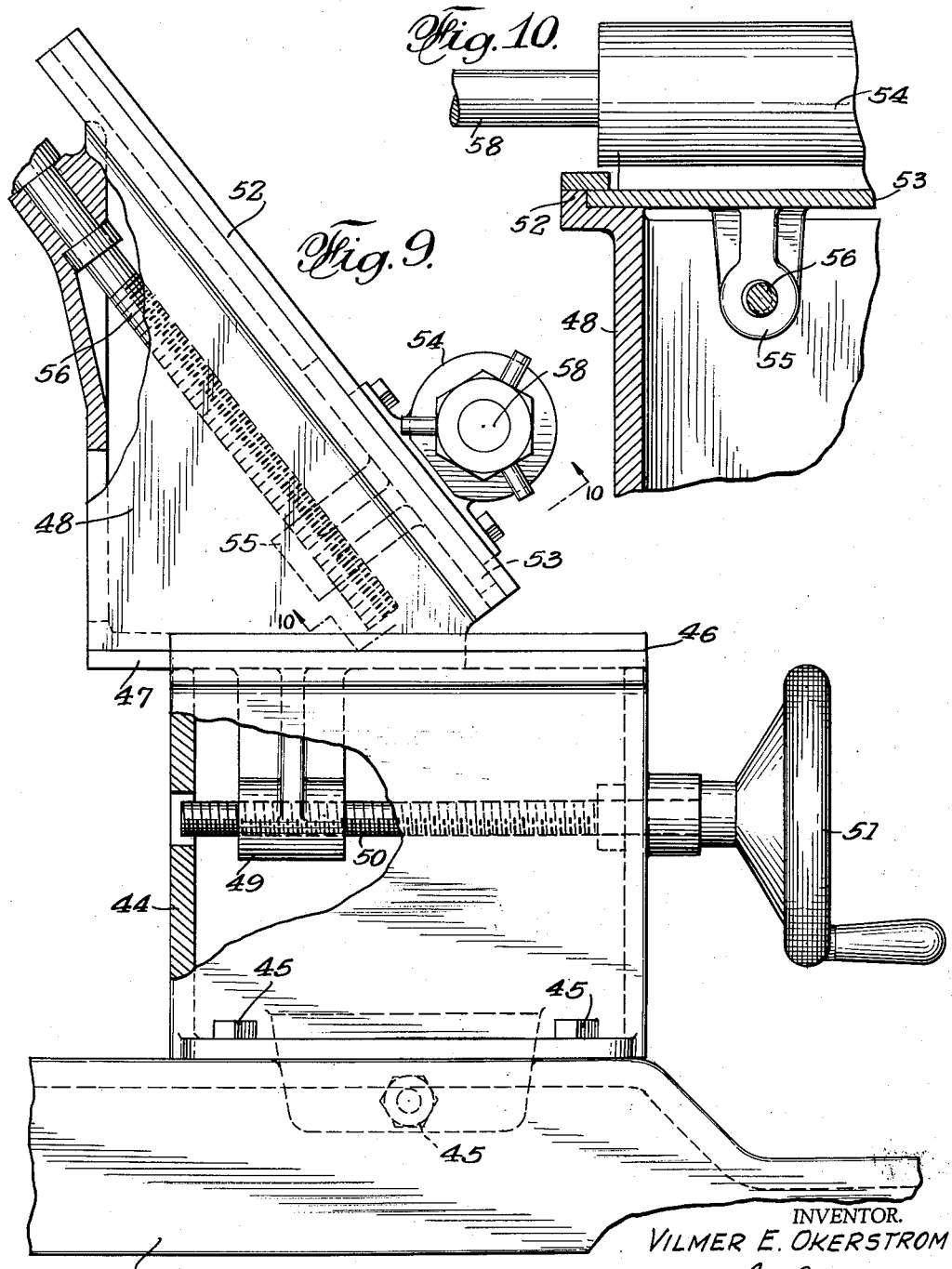

United States Patent Office
2,986,205
Patented May 30, 1961

2,986,205
TIRE TREAD SKIVING MACHINE
Vilmer E. Okerstrom, 1643 W. 84th St.,
Los Angeles, Calif.
Filed Jan. 12, 1959, Ser. No. 786,175
5 Claims. (Cl. 157—13)

This invention relates to a machine for skiving the treads of wheel-mounted tires to balance the latter and, thereby, improve roadability and reduce wear. The present machine is devised for the purpose of correcting eccentricity by skiving the treads at the high points thereof, it being an object of this invention to obtain true concentricity of the tire tread of a wheel-mounted tire.

A wheel may be balanced and yet be out-of-round or, if round, eccentric on the spindle on which it turns. Such out-of-roundness is quite an important contributor to uneven wear, especially in truck tires and in the tires of dual wheels. If the out-of-roundness is inordinately great, correction should be made in the wheel disc or the wheel itself. However, if the deviation from a truly round tire is a matter of a small fraction of an inch or well within the tread thickness, removal of the high points of the tread will not materially impair the tire and will so greatly improve wear resistance that removal of the material will be beneficial.

Another object of the present invention is to provide a tread skiving machine that operates on the tread of a tire while the latter is turning on an axle, substantially the same as if on the axle or spindle of an automotive vehicle, thereby insuring proper balance and concentricity when the wheel is replaced on its truck spindle.

A further object of the invention is to provide a tire skiving machine that provides universal adjustment so as to be capable of accommodating a wide range of tire sizes.

A still further object of the invention is to provide for adjustability that will enable a skiving tool or cutter to follow the cross-sectional contour or shape of treads varying greatly in shape.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Fig. 2 is an enlarged plan view of the right-hand or control end of the machine.

Fig. 3 is a cross-sectional view as seen from the bottom of Fig. 2.

Fig. 4 is a fragmentary plan sectional view of the lower middle portion of Fig. 2.

Fig. 5 is an end view of skiving and sharpening means therefor.

Fig. 6 is a plan view of the left-hand or tire-driving end of the machine.

Fig. 7 is a cross-sectional view as seen from the bottom of Fig. 6.

Fig. 8 is a broken end view as seen from the right-hand end of Fig. 7.

Fig. 9 is a side elevational view, partly in section, of tire mounting means disposed intermediate the ends of the machine as shown in Figs. 2 and 6.

Fig. 10 is a broken cross-sectional view as taken on line 10—10 of Fig. 9.

Figure 1:
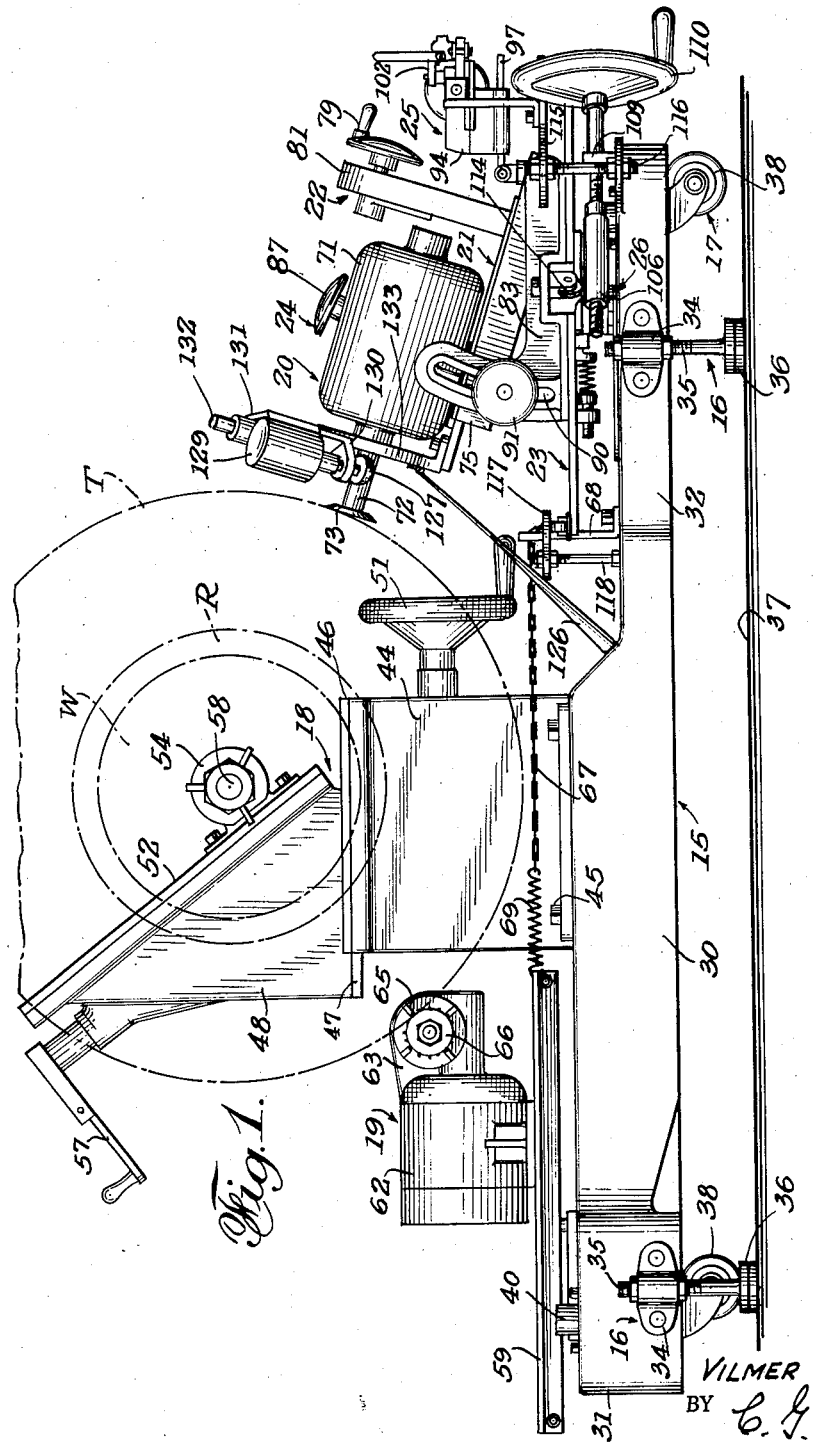
Fig. 1 is a side elevational view of a tire tread skiving machine according to the present invention, a wheel-borne tire being shown in operative position thereon.

The tire-skiving machine that is illustrated comprises, generally, a horizontal base 15, means 16 adjustably supporting said base in fixed position, means 17 to lower the casters and raise the base and its support means so the same is caster-mounted for ready movement along a floor means 18, adjustably carried by the base, for mounting a wheel W on which is provided a tire T, means 19, mounted on one end of the base, for rotating the tire-mounted wheel, a tire-skiving unit 20, a frame 21 mounting said unit, means 22 to adjustably position the unit 20 on the frame 21, a base frame 23 mounting the frame 21, means 24 to adjust the frame 21 relative to the base frame 23, thereby adjusting the skiving unit 20 relative to the base frame, means 25 to move the base frame horizontally relative to the horizontal base 15, and means 26 to guide the movement of the base frame, thereby guiding the movement of the skiving unit 20 relative to the tread of a tire T mounted by means of the wheel W on the means 18.

The base 15 is formed to have an intermediate relatively narrow part 30, and end legs or parts 31 and 32 that are substantially wider, thus imparting to said base a U form in which the part 30 and legs 31 and 32 define a space 33. It will be noted from Fig. 1 that said base, while interiorly hollow, is substantially higher at its left end and at its intermediate part than at its right end.

The means 16 is shown as four adjustable feet so relatively located as to provide the base with a stable support. Each said foot is shown as a threaded bracket 34 affixed to the base, and an adjustable stem 35 in said bracket and provided with a support pad 36. Fig. 1 shows clearly how said means 16 supports the base 15 from a support surface 37.

The means 17 is shown as a set of four caster wheels 38 each carried by a piston 39 vertically operable in a cylinder 40. Said cylinders are fixedly carried by four spaced points of the base 15. The means 17 includes a hydraulic control unit 41 that, by means of a control handle 42, may be operated to extend the pistons 39, bring the raised caster wheels 38 into contact with the support surface 37, and, by continued operation of unit 41, raise the base 15 and its support means off said support surface. Thus, the base 15 becomes wheel-borne, and the same may easily be moved from place to place. A valve 43 in the hydraulic system of the means 17 may be manipulated to release the raised base so the same may lower and be again supported by the means 16. The latter, non-shifting condition of the base is the operative position thereof.

The means 18 is shown as a housing 44 that, by means of bolts 45, may be affixed to and extend upwardly from the part 30 of the horizontal base 15. Provisions may be made to provide for more than one selected position of the housing longitudinally along said base portion. The upper end of the housing is provided with a slideway 46 that is engaged with the slide 47 of a housing extension 48. A fixed nut 49 on the extension 48 depends into the interior of the housing 44 and is engaged by a horizontal feed screw 50 that is journalled in the latter housing and is provided with a control wheel 51. It will be clear that rotation of said wheel in one direction or the other horizontally moves the housing extension 48, accordingly. The adjustment is self-locking.

The housing extension 48 is provided with a sloping slideway 52 that is engaged with the slide 53 of a bearing housing 54 that is directed horizontally transversely of the base 15. A nut 55 extends from the slide 53 into the interior of the housing extension 48 and the same is engaged by a feed screw 56 that is journalled in a wall of said extension and is provided with an operating handle 57, manipulation of which adjusts the bearing housing 54 along the sloping slideway 52. The two controls 51 and 57, together with the ability to select the longitudinal position of the housing 44, enables such universal adjustment of the bearing housing 54 both longitudinally and vertically that the horizontal axle or spindle 58 thereof may support relatively large truck wheels, as well as quite small wheels clear of the base 15 and of the support surface 37. It will be clear that the spindle 58 is freely rotational in its bearing and that the tire of a wheel thereon overstands or may occupy part of the space 33 of the U-shaped base 15.

A wheel W may be mounted in any suitable manner on said spindle 58, provided care is taken that said wheel has a concentric position thereon similar to its position on the wheel spindle of an automotive vehicle. The rim R of the wheel may be gauged for concentricity after the wheel is so mounted and if inordinately eccentric or out-of-round, steps taken to replace the same. If, however, the eccentricity or out-of-roundness is within the ability of the present machine to correct, the skiving operation may be proceeded with.

The means 19 is shown as a horizontal, horizontally movable frame 59 that, by means of longitudinal angle guides 60 and a set of support and guide rollers 61, is carried by the left end of the base 15. Said frame 59 mounts a motor 62 that incorporates a speed reducer 63 that has an output shaft 64 that is parallel to the axle or spindle 58 of the means 18. The shaft 64 is supported by a bearing 65 to minimize flexure thereof and a tack wheel 66 on said shaft is driven by the motor 62 at a slow speed according to the reduced speed of shaft 64.

A chain 67, hooked over a bracket 68 and connected to an expansion spring 69, draws the frame 59 in a direction to cause resilient engagement of the wheel 66 and the tread of tire T. As a consequence, said tire is slowly rotated on the axis of spindle 58. Non-slip of the drive is effected through the medium of peripheral prongs 70 on said wheel 66.

The tire-skiving unit 20 is shown as comprising a motor 71 having a high speed output shaft 72, and a disc cutter 73 carried by the end of said shaft. Said motor is mounted on a slide 74.

The frame 21 comprises a pair of longitudinal slideway members 75 that are connected by cross members 76 and in which the slide 74 is guided. The motor is longitudinally adjustable along said frame 21 by the means 22 which is here shown as a feed screw 77 threadedly engaged in a nut 78 extending from the slide 74 and rotated by a hand wheel 79 through a connecting chain and sprocket drive 80 housed in an elongated housing 81 affixed to the frame 21. Depending on the direction the hand wheel 79 is turned, the cutter 73 may be advanced toward or retracted from the tread of a tire mounted on the means 18. It will be noted that the axis of shaft 72 is normal to that of the spindle 58. Thus, the edge of the cutter disc 73 may be presented in skiving relation to the tread of the tire T.

The base frame 23 comprises a base plate 82, and a pair of brackets 83 transversely spaced and mounted on said plate 82. A pivot 84 connects said brackets 83 with the frame 21 which is disposed between said brackets. As a consequence, the frame 21 and, therefore, the cutter disc may be hingedly adjusted in a vertical plane and relative to the radial extent of the tire T. Thus, the edge of cutter 73 may be placed on a radial line of said tire or as near thereto as practicable for efficient skiving.

The means 24 is provided for adjusting the angle of frame 21. Said means is shown as comprising a nut 85 pivotally carried by one of the brackets 83, a feed screw 86 engaged in said nut and provided with an operating knob 87, a block 88 swively connected to the end of said feed screw and carried by a cross shaft 89, arcuate guide slots 90 provided in the brackets 83 and through which said shaft 89 extends, and a locking knob 91 on the end of shaft 89 opposite to the block 88 to lock the adjustment as made by turning of the knob 87. It will be realized, of course, that the shaft extends through the frame 21.

From the foregoing, it will be seen that the cutter 73 may be presented to a tire tread at a desired angle, regardless of the diametral size of the tire, since such size variations may be taken up by the adjusting means 22.

In addition to the above-described adjustments or movements of the cutter relative to the tire tread, the means 25 and 26 are provided for moving and guiding said cutter horizontally in a manner to follow the transverse contour of the tire tread. Moving and guiding the base frame 23 accomplishes such movement of the cutter.

The means 25 is shown as a lead screw 92 arranged on brackets 93 to be transverse of and at the right or control end of the machine, a bracket 94, having smooth bore guide bearings 95 through which said lead screw 92 is disposed above the right end of the base frame 23. The bracket 94 has a longitudinal guide tube 96, and a pilot stem 97 is slidably engaged in said tube. A swivel mount 98 connects said stem 97 to the frame 23 and has a telescopic connection in a bracket 99 affixed to the base plate 82 of said base frame 23.

A half nut 100 is carried by the bracket 94 by means of a leaf spring 101 that is so biased as to normally raise said half nut out of threaded engagement with the lead screw 92. An over-center or toggle catch 102 is carried by the bracket 94 in a position to press said half nut against the bias of spring 101, into engagement with the lead screw. Therefore, as the screw 92 is turned, as by hand wheel 103, the bracket 94 is fed therealong in a direction according to the direction of rotation of said lead screw.

As will later be seen, the frame 23 is guided to move in an arc with an imaginary center somewhere in the space 33. Accordingly, as the bracket 94 moves transversely of the base 15 along the screw 92, the mount 98 swivels in socket 99 and the stem 97 telescopically slides in the guide tube 96. From any position of the bracket 94 along the lead screw, the same may be quickly shifted to another position simply by actuating the catch 102 and allowing the half nut to spring out of engagement with the lead screw. Such a quick shift shifts the bracket 23 and places the cutter 73 in skiving position with any desired portion of the tire tread.

The guide means 26 comprises a track 104 that is affixed to the top of the base 15 as by a block 105, preferably midway between the side edges of the base part 32. While quite rugged, said track, nevertheless, is flexible and the curvature thereof may be varied, as desired. To this end, each end of the track 104 is connected to a fitting 106 that is threadedly engaged with a lead screw 107. Each fitting 106 is guided for movement in an arcuate slot 108 formed in the base 15, the center of curvature thereof being approximately where block 105 is fastened to said base. A swivel block 109 carries each screw 107 in horizontal disposition, and a hand wheel 110 is provided for rotating each screw. Accordingly, an operator positioned at the right end of the machine may manipulate the hand wheels 110 to impart to the track 104 a desired curvature which is preferably an approximation of the transverse curvature of the tread on the tire to be skived.

The base frame 23, as by fixed brackets 111 on one side and slidable brackets 112 on the opposite side of the track 104 carries two opposed pairs of rollers or wheels 113 that engage the opposite sides of said track. Accordingly, as the frame 23 is moved by the screw 92, the same, and, therefore, the cutter 73, moves in an arcuate path as guided by said track.

The top edge of the track 104 serves to locate the frame 23 in fixed spaced relation to the base 15, a pair of rollers 114, carried by said frame, being provided to engage with and track along said edge. To steady the frame 23, a fixed guide bar 115 is carried by studs 116 from the rightmost end of the base 15 and a somewhat similar guide bar 117 is carried by studs 118 from the base inward of said rightmost end. As seen in Figs. 2 and 3, said bars are disposed, one on each side of the track 104. A roller 119 at the right end of frame plate 82 and a similar roller 120 at the left end of said plate engage the under faces of the guide bars and track therealong in arcuate paths as controlled by the curvature of track 104.

Since the track 104 may vary as to curvature, the rollers 113 are resiliently pressed against said track to effectively guide the frame 23 under all conditions of curvature. Thus, the slidable brackets 112 are guided in slides 121, and the same are biased to track-engaging position by springs 122, the tension of which may be adjusted by screws 123.

Electric current for motors 62 and 71 may be brought to the machine by connection to a socket box 124. True leveling of the machine may be achieved by providing one of the stems 35 with a leveling knob 125. Rubber shaved or skived from a tire tread may be intercepted by a chute plate 126 to keep the same from accumulating on the machine.

The cutter may be sharpened in conventional ways. Fig. 5, however, shows means that provide a convenient and rapid way for sharpening said cutter. A sharpening stone 127 is carried by the shaft 128 of a motor 129, a bracket 130 being provided to steady said shaft. By means of a bracket 131, said motor is carried by a fixed stud 132 secured to a bracket 133 which is positioned adjacent one end of motor 71 and is affixed to the slide 74 on which said motor is mounted. A slideway 134 in stud 132 is engaged by a pin 135 on the bracket 131 to hold the stone 127 out of engagement with the cutter wheel 73. By sliding the bracket 131 downwardly on stud 132 until the pin 135 finds a notch 136 in said slideway 134, the bracket 131 and everything mounted thereon may be swung on the axis of said stud to bring the stone 127 in sharpening engagement with the cutter disc.

The operation is quite simple. After mounting a wheel and its tire on the means 18, the operator may manipulate the hand wheels and knobs 79, 87 and 110 to bring the cutter disc in proper position with respect to the tread of said tire. By releasing the catch 102, the frame 23 may be quickly swung back and forth as the hand wheels 110 are turned to adjust the curvature of the track 104. Now, the motor 62 may be started to start slow rotation of the tire T. The operator now manipulates the hand wheel 103 to slowly oscillate the frame 23 and cause the cutter to traverse the tire tread. It will be clear that said cutter will shave off any high spots on the tread to bring the same into accurate concentricity with the center of axle 58.

Since one adjustment of the machine will serve for a set of four, six or more wheels of a vehicle, the preparation time is necessary only for the first wheel.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what is claimed and desired to be secured by Letters Patent is:

1. In combination, a base, a curved guide member above said base, a middle connection on the guide member anchoring the same to the base, adjustable means connected to each end of the guide member to adjust the transverse curvature of the latter member relative to the base, a frame engaged with the base to track along the guide member in an arcuate path corresponding to the curvature of the guide member, a lead screw above and transverse to the base, nut means engaged with the lead screw to traverse the same upon rotation of said screw, a telescopic and swivel connection between the nut means and the mentioned frame, means to release the nut from engagement with the lead screw to enable rapid movement of the frame independently of the lead screw, and a skiving cutter carried by the frame and movable in the path thereof.

2. The combination according to claim 1 in which the means mounting the skiving unit is provided with a bracket, and a cutter-sharpening device carried by the latter bracket.

3. In a tire tread skiving machine, a base, a flexible track disposed transversely of and above the surface of said base, a centrally disposed block connecting the middle of said track to the base, the ends of the track extending oppositely toward the sides of the base, independent means to flex the ends of the track to vary the degree of curvature thereof, each said means comprising a lead screw having one end swivelly connected to the base and a fitting connected to the end of the track and in threaded engagement with said lead screw, the base having an arcuate slot with its curvature generated on the center of the mentioned block and in which a portion of said fitting extends for guiding engagement during actuation of the lead screw, tread skiving tool unit provided with transversely spaced pairs of rollers, each pair being engaged with opposite faces of the track to guide said unit, and means slidably connected to the unit and adjustably movable along a straight line to move said unit in an arcuate path as guided by the track.

4. In a tire tread skiving machine according to claim 3, said track having a top edge parallel to the base, and a pair of rollers carried by the unit and tracking on said edge to locate said unit in fixed spaced relation to said base.

5. In a tire tread skiving machine according to claim 3, one roller of each pair being fixedly mounted on the unit and the other roller of each pair being provided with means to bias the same toward the fixedly mounted rollers.

References Cited in the file of this patent

UNITED STATES PATENTS

| | | |
|---|---|---|
| 1,891,789 | Wheeler | Dec. 20, 1932 |
| 2,009,524 | Schmidt | July 30, 1935 |
| 2,392,667 | Hawkinson | Jan. 8, 1946 |
| 2,651,893 | Braley | Sept. 15, 1953 |
| 2,751,979 | Holland | June 26, 1956 |
| 2,765,845 | Bullis | Oct. 9, 1956 |
| 2,893,479 | Sheridan et al. | July 7, 1959 |
| 2,925,125 | Curry | Feb. 16, 1960 |